(12) United States Patent
Backholm (10) Patent No.: US 8,078,158 B2
(45) Date of Patent: Dec. 13, 2011

(54) PROVISIONING APPLICATIONS FOR A MOBILE DEVICE

(75) Inventor: Ari Backholm, Redwood City, CA (US)

(73) Assignee: Seven Networks, Inc., Redwood City, CA (US)

( * ) Notice: Subject to any disclaimer, the term of this patent is extended or adjusted under 35 U.S.C. 154(b) by 529 days.

(21) Appl. No.: 12/215,481

(22) Filed: Jun. 26, 2008

(65) Prior Publication Data

US 2009/0325565 A1    Dec. 31, 2009

(51) Int. Cl.
*H04M 3/00* (2006.01)

(52) U.S. Cl. ........................................ 455/419; 709/217

(58) Field of Classification Search .......... 455/418–420; 709/201–246; 717/168–178
See application file for complete search history.

(56) References Cited

U.S. PATENT DOCUMENTS

| | | |
|---|---|---|
| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |

(Continued)

FOREIGN PATENT DOCUMENTS

EP    0772327 A2    5/1997

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Kent Chang
*Assistant Examiner* — Kashif Siddiqui
(74) *Attorney, Agent, or Firm* — Perkins Coie LLP (57) ABSTRACT

Methods and systems for provisioning an application for a mobile device are provided. A user may request an application. A request concerning the application is sent to a provisioning device. The request includes information concerning the mobile device and/or the user of the mobile device. The information is used to determine the requirements for operating the requested application on the mobile device. A hyperlink for downloading the requirements information is sent to the user of the mobile device via text messaging and/or email. The requirements information may be provided directly to the mobile device, to a personal computing device associated with the user of the mobile device, or a combination.

26 Claims, 3 Drawing Sheets

U.S. PATENT DOCUMENTS

| | | |
|---|---|---|
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |

| | | | |
|---|---|---|---|
| 6,088,677 A | 7/2000 | Spurgeon | |
| 6,101,320 A | 8/2000 | Schuetze et al. | |
| 6,101,480 A | 8/2000 | Conmy et al. | |
| 6,101,531 A | 8/2000 | Eggleston et al. | |
| 6,112,181 A | 8/2000 | Shear et al. | |
| 6,119,014 A | 9/2000 | Alperovich et al. | |
| 6,119,171 A | 9/2000 | Alkhatib | |
| 6,125,369 A | 9/2000 | Wu et al. | |
| 6,125,388 A | 9/2000 | Reisman | |
| 6,128,627 A | 10/2000 | Mattis et al. | |
| 6,130,898 A | 10/2000 | Kostreski et al. | |
| 6,131,096 A | 10/2000 | Ng et al. | |
| 6,131,116 A | 10/2000 | Riggins et al. | |
| 6,134,432 A | 10/2000 | Holmes et al. | |
| 6,138,013 A | 10/2000 | Blanchard et al. | |
| 6,138,124 A | 10/2000 | Beckhardt | |
| 6,138,128 A | 10/2000 | Perkowitz et al. | |
| 6,138,146 A | 10/2000 | Moon et al. | |
| 6,141,664 A | 10/2000 | Boothby | |
| 6,151,606 A | 11/2000 | Mendez | |
| 6,157,630 A | 12/2000 | Adler et al. | |
| 6,161,140 A | 12/2000 | Moriya | |
| 6,167,379 A | 12/2000 | Dean et al. | |
| 6,167,435 A | 12/2000 | Druckenmiller et al. | |
| 6,170,014 B1 | 1/2001 | Darago et al. | |
| 6,173,312 B1 | 1/2001 | Atarashi et al. | |
| 6,173,446 B1 | 1/2001 | Khan et al. | |
| 6,175,831 B1 | 1/2001 | Weinreich et al. | |
| 6,178,419 B1 | 1/2001 | Legh-Smith et al. | |
| 6,181,935 B1 | 1/2001 | Gossman et al. | |
| 6,195,533 B1 | 2/2001 | Tkatch et al. | |
| 6,198,696 B1 | 3/2001 | Korpi et al. | |
| 6,198,922 B1 | 3/2001 | Baynham | |
| 6,201,469 B1 | 3/2001 | Balch et al. | |
| 6,202,085 B1 | 3/2001 | Benson et al. | |
| 6,205,448 B1 | 3/2001 | Kruglikov et al. | |
| 6,212,529 B1 | 4/2001 | Boothby et al. | |
| 6,219,694 B1 | 4/2001 | Lazaridis et al. | |
| 6,221,877 B1 | 4/2001 | Aronov et al. | |
| 6,223,187 B1 | 4/2001 | Boothby et al. | |
| 6,226,686 B1 | 5/2001 | Rothschild et al. | |
| 6,233,341 B1 | 5/2001 | Riggins | |
| 6,243,705 B1 | 6/2001 | Kucala | |
| 6,246,875 B1 | 6/2001 | Seazholtz et al. | |
| 6,247,135 B1 | 6/2001 | Feague | |
| 6,249,808 B1 | 6/2001 | Seshadri | |
| 6,256,666 B1 | 7/2001 | Singhal | |
| 6,263,201 B1 | 7/2001 | Hashimoto et al. | |
| 6,263,340 B1 | 7/2001 | Green | |
| 6,269,369 B1 | 7/2001 | Robertson | |
| 6,272,545 B1 | 8/2001 | Flanagin et al. | |
| 6,275,850 B1 | 8/2001 | Beyda et al. | |
| 6,289,212 B1 | 9/2001 | Stein et al. | |
| 6,292,904 B1 | 9/2001 | Broomhall et al. | |
| 6,295,541 B1 | 9/2001 | Bodnar et al. | |
| 6,300,947 B1 | 10/2001 | Kanevsky | |
| 6,304,881 B1 | 10/2001 | Halim et al. | |
| 6,308,201 B1 | 10/2001 | Pivowar et al. | |
| 6,317,594 B1 | 11/2001 | Gossman et al. | |
| 6,320,943 B1 | 11/2001 | Borland | |
| 6,324,541 B1 | 11/2001 | de l'Etraz et al. | |
| 6,324,542 B1 | 11/2001 | Wright, Jr. et al. | |
| 6,324,544 B1 | 11/2001 | Alam et al. | |
| 6,324,587 B1 | 11/2001 | Trenbeath et al. | |
| 6,327,586 B1 | 12/2001 | Kisiel | |
| 6,336,117 B1 | 1/2002 | Massarani | |
| 6,356,937 B1 | 3/2002 | Montville et al. | |
| 6,363,352 B1 | 3/2002 | Dailey et al. | |
| 6,370,566 B2 | 4/2002 | Discolo et al. | |
| 6,377,810 B1 | 4/2002 | Geiger et al. | |
| 6,380,959 B1 | 4/2002 | Wang et al. | |
| 6,389,455 B1 | 5/2002 | Fuisz | |
| 6,389,457 B2 | 5/2002 | Lazaridis et al. | |
| 6,397,057 B1 | 5/2002 | Malackowski et al. | |
| 6,397,230 B1 | 5/2002 | Carmel et al. | |
| 6,401,104 B1 | 6/2002 | LaRue et al. | |
| 6,401,112 B1 | 6/2002 | Boyer et al. | |
| 6,401,113 B2 | 6/2002 | Lazaridis et al. | |
| 6,405,197 B2 | 6/2002 | Gilmour | |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Makipaa et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Multer et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |

| | | | | | | |
|---|---|---|---|---|---|---|
| 6,820,204 B1 | 11/2004 | Desai et al. | | 7,240,095 B1 | 7/2007 | Lewis |
| 6,829,487 B2 | 12/2004 | Eiden et al. | | 7,242,680 B2 | 7/2007 | Gallant |
| 6,834,195 B2 | 12/2004 | Brandenberg et al. | | 7,245,926 B2 | 7/2007 | Liao et al. |
| 6,847,974 B2 | 1/2005 | Wachtel | | 7,257,391 B2 | 8/2007 | Burgess et al. |
| 6,850,757 B2 | 2/2005 | Watanabe et al. | | 7,259,666 B1 | 8/2007 | Hermsmeyer et al. |
| 6,859,212 B2 | 2/2005 | Kumar et al. | | 7,260,552 B2 | 8/2007 | Riera Jorba et al. |
| 6,867,774 B1 | 3/2005 | Halmshaw et al. | | 7,260,590 B1 | 8/2007 | Williams |
| 6,868,447 B1 | 3/2005 | Slaughter et al. | | 7,272,830 B2 | 9/2007 | de Jong |
| 6,871,220 B1 | 3/2005 | Rajan et al. | | 7,277,408 B2 | 10/2007 | Sorsa |
| 6,873,688 B1 | 3/2005 | Aarnio | | 7,289,792 B1 | 10/2007 | Turunen |
| 6,879,985 B1 | 4/2005 | Deguchi et al. | | 7,289,964 B1 | 10/2007 | Bowman-Amuah |
| 6,886,030 B1 | 4/2005 | Easterbrook | | 7,289,971 B1 | 10/2007 | O'Neil et al. |
| 6,892,070 B2 | 5/2005 | Warrier et al. | | 7,293,107 B1 | 11/2007 | Hanson et al. |
| 6,892,196 B1 | 5/2005 | Hughes | | 7,295,853 B2 | 11/2007 | Jin et al. |
| 6,895,394 B1 | 5/2005 | Kremer et al. | | 7,305,700 B2 | 12/2007 | Boynton et al. |
| 6,895,558 B1 | 5/2005 | Loveland | | 7,310,350 B1 | 12/2007 | Shao et al. |
| 6,898,427 B1 | 5/2005 | Griffith et al. | | 7,310,729 B2 | 12/2007 | Gordon et al. |
| 6,922,547 B2 | 7/2005 | O'Neill et al. | | 7,349,871 B2 | 3/2008 | Labrou et al. |
| 6,922,721 B1 | 7/2005 | Minborg et al. | | 7,359,720 B2 | 4/2008 | Hartmaier et al. |
| 6,925,477 B1 | 8/2005 | Champagne et al. | | 7,373,386 B2 | 5/2008 | Gardner et al. |
| 6,931,529 B2 | 8/2005 | Kunzinger | | 7,374,099 B2 | 5/2008 | de Jong |
| 6,938,079 B1 | 8/2005 | Anderson et al. | | 7,376,701 B2 | 5/2008 | Bhargava et al. |
| 6,944,447 B2 | 9/2005 | Portman et al. | | 7,382,879 B1 | 6/2008 | Miller |
| 6,944,662 B2 | 9/2005 | Devine et al. | | 7,388,950 B2 | 6/2008 | Elsey et al. |
| 6,947,770 B2 | 9/2005 | Rydbeck | | 7,389,412 B2 | 6/2008 | Sharma et al. |
| 6,957,397 B1 | 10/2005 | Hawkins et al. | | 7,392,483 B2 | 6/2008 | Wong et al. |
| 6,965,917 B1 | 11/2005 | Aloni | | 7,395,329 B1 | 7/2008 | Holt et al. |
| 6,966,058 B2 | 11/2005 | Earl et al. | | 7,430,609 B2 | 9/2008 | Brown et al. |
| 6,968,175 B2 | 11/2005 | Raivisto et al. | | 7,441,271 B2 | 10/2008 | Fiatal et al. |
| 6,970,879 B1 | 11/2005 | Gilmour | | 7,461,071 B2 | 12/2008 | Fitzpatrick et al. |
| 6,972,682 B2 | 12/2005 | Lareau et al. | | 7,465,231 B2 | 12/2008 | Lewin et al. |
| 6,973,299 B2 | 12/2005 | Apfel | | 7,469,125 B2 | 12/2008 | Nurmi |
| 6,981,047 B2 | 12/2005 | Hanson et al. | | 7,483,036 B2 | 1/2009 | Moore |
| 6,986,061 B1 | 1/2006 | Kunzinger | | 7,499,537 B2 | 3/2009 | Elsey et al. |
| 6,987,734 B2 | 1/2006 | Hundemer | | 7,502,615 B2 | 3/2009 | Wilhoite et al. |
| 6,990,472 B2 | 1/2006 | Rosenhaft et al. | | 7,519,042 B2 | 4/2009 | Gorday et al. |
| 6,993,326 B2 | 1/2006 | Link, II et al. | | 7,532,571 B1 | 5/2009 | Price et al. |
| 6,993,327 B2 | 1/2006 | Mathis | | 7,539,665 B2 | 5/2009 | Mendez |
| 6,999,753 B2 | 2/2006 | Beckmann et al. | | 7,551,900 B2 | 6/2009 | Kang et al. |
| 7,026,984 B1 | 4/2006 | Thandu et al. | | 7,567,575 B2 | 7/2009 | Chen et al. |
| 7,032,242 B1 | 4/2006 | Grabelsky et al. | | 7,574,208 B2 | 8/2009 | Hanson et al. |
| 7,035,630 B2 | 4/2006 | Knowles | | 7,575,171 B2 | 8/2009 | Lev |
| 7,046,993 B2 | 5/2006 | Haaramo et al. | | 7,587,482 B2 | 9/2009 | Henderson et al. |
| 7,047,202 B2 | 5/2006 | Jaipuria et al. | | 7,593,714 B2 | 9/2009 | Schultz et al. |
| 7,062,024 B2 | 6/2006 | Kreckel et al. | | 7,596,608 B2 | 9/2009 | Alexander et al. |
| 7,069,308 B2 | 6/2006 | Abrams | | 7,643,818 B2 | 1/2010 | Backholm et al. |
| 7,072,678 B2 | 7/2006 | Allison | | 7,644,166 B2 | 1/2010 | Appelman et al. |
| 7,079,499 B1 | 7/2006 | Akhtar et al. | | 7,672,439 B2 | 3/2010 | Appelman et al. |
| 7,082,316 B2 | 7/2006 | Eiden et al. | | 7,680,281 B2 | 3/2010 | Fiatal et al. |
| 7,085,365 B2 | 8/2006 | Kauppinen | | 7,689,664 B2 * | 3/2010 | Karlberg ................ 709/217 |
| 7,096,030 B2 | 8/2006 | Huomo | | 7,693,944 B2 | 4/2010 | Appelman et al. |
| 7,100,821 B2 | 9/2006 | Rasti | | 7,706,781 B2 | 4/2010 | Backholm et al. |
| 7,103,432 B2 | 9/2006 | Drader et al. | | 7,752,633 B1 | 7/2010 | Fleming |
| 7,120,692 B2 | 10/2006 | Hesselink et al. | | 7,757,956 B2 | 7/2010 | Koenck et al. |
| 7,120,928 B2 | 10/2006 | Sheth et al. | | 7,769,395 B2 | 8/2010 | Fiatal et al. |
| 7,130,839 B2 | 10/2006 | Boreham et al. | | 7,769,400 B2 | 8/2010 | Backholm et al. |
| 7,136,645 B2 | 11/2006 | Hanson et al. | | 7,796,742 B1 | 9/2010 | Sutaria et al. |
| 7,139,555 B2 | 11/2006 | Apfel | | 7,797,064 B2 | 9/2010 | Loomis et al. |
| 7,139,565 B2 | 11/2006 | Fiatal et al. | | 7,827,597 B2 | 11/2010 | Boynton et al. |
| 7,140,549 B2 | 11/2006 | de Jong | | 7,853,563 B2 | 12/2010 | Alvarado et al. |
| 7,146,645 B1 | 12/2006 | Hellsten et al. | | 7,877,703 B1 | 1/2011 | Fleming |
| 7,149,780 B2 | 12/2006 | Quine et al. | | 7,917,505 B2 | 3/2011 | van Gent et al. |
| 7,149,789 B2 | 12/2006 | Slivka et al. | | 7,921,167 B2 | 4/2011 | Shroff et al. |
| 7,149,959 B1 | 12/2006 | Jones et al. | | 2001/0009025 A1 | 7/2001 | Ahonen |
| 7,162,241 B2 | 1/2007 | Kim et al. | | 2001/0010046 A1 | 7/2001 | Muyres et al. |
| 7,165,727 B2 | 1/2007 | de Jong | | 2001/0023414 A1 | 9/2001 | Kumar et al. |
| 7,172,118 B2 | 2/2007 | Urken | | 2001/0032254 A1 | 10/2001 | Hawkins |
| 7,181,228 B2 | 2/2007 | Boesch | | 2001/0034225 A1 | 10/2001 | Gupte |
| 7,184,790 B2 | 2/2007 | Dorenbosch et al. | | 2001/0034244 A1 | 10/2001 | Calder et al. |
| 7,194,273 B2 | 3/2007 | Vaudreuil | | 2001/0037453 A1 | 11/2001 | Mitty et al. |
| 7,200,390 B1 | 4/2007 | Henager et al. | | 2001/0039191 A1 | 11/2001 | Maierhofer |
| 7,206,806 B2 | 4/2007 | Pineau | | 2001/0041566 A1 | 11/2001 | Xanthos et al. |
| 7,209,757 B2 | 4/2007 | Naghian et al. | | 2001/0042009 A1 | 11/2001 | Montague |
| 7,219,222 B1 | 5/2007 | Durbin et al. | | 2001/0042099 A1 | 11/2001 | Peng |
| 7,224,957 B2 | 5/2007 | Spector | | 2001/0043148 A1 | 11/2001 | Stewart |
| 7,231,206 B2 | 6/2007 | Cudak et al. | | 2002/0002478 A1 | 1/2002 | Swart et al. |
| 7,233,795 B1 | 6/2007 | Ryden | | 2002/0007303 A1 | 1/2002 | Brookler et al. |
| 7,234,111 B2 | 6/2007 | Chu et al. | | 2002/0013727 A1 | 1/2002 | Lee |
| 7,239,877 B2 | 7/2007 | Corneille et al. | | 2002/0019225 A1 | 2/2002 | Miyashita |

| | | | | | | |
|---|---|---|---|---|---|---|
| 2002/0019812 A1 | 2/2002 | Board et al. | | 2003/0208559 A1 | 11/2003 | Velline et al. |
| 2002/0035556 A1 | 3/2002 | Shah et al. | | 2003/0211845 A1 | 11/2003 | Lohtia et al. |
| 2002/0035617 A1 | 3/2002 | Lynch et al. | | 2003/0217098 A1 | 11/2003 | Bobde et al. |
| 2002/0038253 A1 | 3/2002 | Seaman et al. | | 2003/0217142 A1 | 11/2003 | Bobde et al. |
| 2002/0042875 A1 | 4/2002 | Shukla | | 2003/0223554 A1 | 12/2003 | Zhang |
| 2002/0049828 A1 | 4/2002 | Pekarek-Kostka | | 2003/0227745 A1 | 12/2003 | Khoo |
| 2002/0053078 A1 | 5/2002 | Holtz et al. | | 2003/0235308 A1 | 12/2003 | Boynton et al. |
| 2002/0055351 A1 | 5/2002 | Elsey et al. | | 2003/0236981 A1 | 12/2003 | Marmigere et al. |
| 2002/0059201 A1 | 5/2002 | Work | | 2004/0002324 A1 | 1/2004 | Juntunen et al. |
| 2002/0059457 A1 | 5/2002 | Ballard et al. | | 2004/0006630 A1 | 1/2004 | Friend et al. |
| 2002/0068559 A1 | 6/2002 | Sharma et al. | | 2004/0024795 A1 | 2/2004 | Hind et al. |
| 2002/0073207 A1 | 6/2002 | Widger et al. | | 2004/0024892 A1 | 2/2004 | Creswell et al. |
| 2002/0077077 A1 | 6/2002 | Rezvani et al. | | 2004/0027326 A1 | 2/2004 | Hays et al. |
| 2002/0077084 A1 | 6/2002 | Zellner et al. | | 2004/0027375 A1 | 2/2004 | Ellis et al. |
| 2002/0078384 A1 | 6/2002 | Hippelainen | | 2004/0027378 A1 | 2/2004 | Hays et al. |
| 2002/0087679 A1 | 7/2002 | Pulley et al. | | 2004/0043770 A1 | 3/2004 | Amit et al. |
| 2002/0089542 A1 | 7/2002 | Imamura | | 2004/0049599 A1 | 3/2004 | Friend et al. |
| 2002/0091921 A1 | 7/2002 | Kunzinger | | 2004/0051715 A1 | 3/2004 | Brokenshire et al. |
| 2002/0095319 A1 | 7/2002 | Swart et al. | | 2004/0054739 A1 | 3/2004 | Friend et al. |
| 2002/0095328 A1 | 7/2002 | Swart et al. | | 2004/0064445 A1 | 4/2004 | Pfleging et al. |
| 2002/0095391 A1 | 7/2002 | Swart et al. | | 2004/0064488 A1 | 4/2004 | Sinha |
| 2002/0095399 A1 | 7/2002 | Devine et al. | | 2004/0068698 A1 | 4/2004 | Wu et al. |
| 2002/0098855 A1 | 7/2002 | Hartmaier et al. | | 2004/0073476 A1 | 4/2004 | Donahue et al. |
| 2002/0099613 A1 | 7/2002 | Swart et al. | | 2004/0073651 A1 | 4/2004 | Beaulieu et al. |
| 2002/0101975 A1 | 8/2002 | Tiburtius et al. | | 2004/0075675 A1 | 4/2004 | Raivisto et al. |
| 2002/0116499 A1 | 8/2002 | Enns et al. | | 2004/0075695 A1 | 4/2004 | Chew et al. |
| 2002/0116501 A1 | 8/2002 | Ho et al. | | 2004/0078814 A1 | 4/2004 | Allen |
| 2002/0120766 A1 | 8/2002 | Okajima et al. | | 2004/0080515 A1 | 4/2004 | Hagiwara |
| 2002/0120779 A1 | 8/2002 | Teeple et al. | | 2004/0082346 A1 | 4/2004 | Skytt |
| 2002/0126701 A1 | 9/2002 | Requena | | 2004/0098625 A1 | 5/2004 | Lagadec et al. |
| 2002/0133504 A1 | 9/2002 | Vlahos et al. | | 2004/0103147 A1 | 5/2004 | Flesher et al. |
| 2002/0144109 A1 | 10/2002 | Benantar et al. | | 2004/0120323 A1 | 6/2004 | Viikari et al. |
| 2002/0146129 A1 | 10/2002 | Kaplan | | 2004/0128375 A1 | 7/2004 | Rockwell |
| 2002/0152379 A1 | 10/2002 | Gefwert et al. | | 2004/0133626 A1 | 7/2004 | Herrero et al. |
| 2002/0155848 A1 | 10/2002 | Suryanarayana | | 2004/0141011 A1 | 7/2004 | Smethers et al. |
| 2002/0158908 A1 | 10/2002 | Vaajala et al. | | 2004/0147262 A1 | 7/2004 | Lescuyer et al. |
| 2002/0161587 A1 | 10/2002 | Pitts et al. | | 2004/0158611 A1 | 8/2004 | Daniell et al. |
| 2002/0161925 A1 | 10/2002 | Munger et al. | | 2004/0167966 A1 | 8/2004 | Lee et al. |
| 2002/0161928 A1 | 10/2002 | Ndili | | 2004/0170257 A1 | 9/2004 | Gross et al. |
| 2002/0164977 A1 | 11/2002 | Link, II et al. | | 2004/0172481 A1 | 9/2004 | Engstrom |
| 2002/0186848 A1 | 12/2002 | Shaik | | 2004/0176128 A1 | 9/2004 | Grabelsky et al. |
| 2002/0188940 A1 | 12/2002 | Breckner et al. | | 2004/0177369 A1 | 9/2004 | Akins |
| 2002/0193094 A1 | 12/2002 | Lawless et al. | | 2004/0179513 A1 | 9/2004 | Smith et al. |
| 2002/0194209 A1 | 12/2002 | Bolosky et al. | | 2004/0181550 A1 | 9/2004 | Warsta et al. |
| 2002/0198027 A1 | 12/2002 | Rydbeck | | 2004/0186902 A1 | 9/2004 | Stewart |
| 2003/0005151 A1 | 1/2003 | Ullman et al. | | 2004/0189610 A1 | 9/2004 | Friend |
| 2003/0022662 A1 | 1/2003 | Mittal | | 2004/0199497 A1 | 10/2004 | Timmons |
| 2003/0023975 A1 | 1/2003 | Schrader et al. | | 2004/0199582 A1 | 10/2004 | Kucharewski et al. |
| 2003/0028430 A1 | 2/2003 | Zimmerman | | 2004/0205248 A1 | 10/2004 | Little et al. |
| 2003/0028441 A1 | 2/2003 | Barsness et al. | | 2004/0205330 A1 | 10/2004 | Godfrey et al. |
| 2003/0050041 A1 | 3/2003 | Wu | | 2004/0209602 A1 | 10/2004 | Joyce et al. |
| 2003/0054810 A1 | 3/2003 | Chen et al. | | 2004/0210639 A1 | 10/2004 | Ben-Yoseph et al. |
| 2003/0056096 A1 | 3/2003 | Albert et al. | | 2004/0230619 A1 | 11/2004 | Blanco et al. |
| 2003/0060188 A1 | 3/2003 | Gidron et al. | | 2004/0236792 A1 | 11/2004 | Celik |
| 2003/0063120 A1 | 4/2003 | Wong et al. | | 2004/0252816 A1 | 12/2004 | Nicolas |
| 2003/0065738 A1 | 4/2003 | Yang et al. | | 2004/0255126 A1 | 12/2004 | Reith |
| 2003/0065802 A1 | 4/2003 | Vitikainen et al. | | 2004/0258231 A1 | 12/2004 | Elsey et al. |
| 2003/0070061 A1 | 4/2003 | Wong et al. | | 2004/0259535 A1 | 12/2004 | Elsey et al. |
| 2003/0072451 A1 | 4/2003 | Pimentel et al. | | 2004/0266364 A1 | 12/2004 | Nguyen et al. |
| 2003/0078880 A1 | 4/2003 | Alley et al. | | 2004/0268148 A1 | 12/2004 | Karjala et al. |
| 2003/0084165 A1 | 5/2003 | Kjellberg | | 2005/0002501 A1 | 1/2005 | Elsey et al. |
| 2003/0088629 A1 | 5/2003 | Berkowitz et al. | | 2005/0002508 A1 | 1/2005 | Elsey et al. |
| 2003/0093691 A1 | 5/2003 | Simon et al. | | 2005/0002509 A1 | 1/2005 | Elsey et al. |
| 2003/0097381 A1 | 5/2003 | Detweiler et al. | | 2005/0002510 A1 | 1/2005 | Elsey et al. |
| 2003/0100321 A1 | 5/2003 | Rao et al. | | 2005/0010694 A1 | 1/2005 | Ma et al. |
| 2003/0100326 A1 | 5/2003 | Grube et al. | | 2005/0015432 A1 | 1/2005 | Cohen |
| 2003/0117432 A1 | 6/2003 | Kautto-Kiovula et al. | | 2005/0021750 A1 | 1/2005 | Abrams |
| 2003/0125023 A1 | 7/2003 | Fishler | | 2005/0022182 A1* | 1/2005 | Mittal ............ 717/178 |
| 2003/0126216 A1 | 7/2003 | Avila et al. | | 2005/0027591 A9 | 2/2005 | Gailey et al. |
| 2003/0130984 A1 | 7/2003 | Quinlan et al. | | 2005/0027716 A1 | 2/2005 | Apfel |
| 2003/0146934 A1 | 8/2003 | Bailey et al. | | 2005/0033812 A1 | 2/2005 | McCarthy et al. |
| 2003/0153338 A1 | 8/2003 | Herz et al. | | 2005/0038707 A1 | 2/2005 | Roever et al. |
| 2003/0154212 A1 | 8/2003 | Schirmer et al. | | 2005/0038724 A1 | 2/2005 | Roever et al. |
| 2003/0156146 A1 | 8/2003 | Suomela et al. | | 2005/0038863 A1 | 2/2005 | Onyon et al. |
| 2003/0157947 A1 | 8/2003 | Fiatal et al. | | 2005/0041793 A1 | 2/2005 | Fulton et al. |
| 2003/0169262 A1 | 9/2003 | Lavelle et al. | | 2005/0044144 A1 | 2/2005 | Malik et al. |
| 2003/0177281 A1 | 9/2003 | McQuillan et al. | | 2005/0055578 A1 | 3/2005 | Wright et al. |
| 2003/0182431 A1 | 9/2003 | Sturniolo et al. | | 2005/0063544 A1 | 3/2005 | Uusitalo et al. |
| 2003/0208529 A1 | 11/2003 | Pendyala et al. | | 2005/0071674 A1 | 3/2005 | Chou et al. |

| Pub. No. | Date | Inventor |
|---|---|---|
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154796 A1 | 7/2005 | Forsyth |
| 2005/0155027 A1 | 7/2005 | Wei |
| 2005/0164721 A1 | 7/2005 | Yeh et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0203966 A1 | 9/2005 | Labrou et al. |
| 2005/0210104 A1 | 9/2005 | Torvinen |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0063544 A1 | 3/2006 | Zhao et al. |
| 2006/0069686 A1 | 3/2006 | Beyda et al. |
| 2006/0069687 A1 | 3/2006 | Cui |
| 2006/0073810 A1 | 4/2006 | Pyhalammi et al. |
| 2006/0074951 A1 | 4/2006 | Beier et al. |
| 2006/0084410 A1 | 4/2006 | Sutaria et al. |
| 2006/0085503 A1 | 4/2006 | Stoye et al. |
| 2006/0093135 A1 | 5/2006 | Fiatal et al. |
| 2006/0099969 A1 | 5/2006 | Staton et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0165226 A1 | 7/2006 | Ernst et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0188864 A1 | 8/2006 | Shah |
| 2006/0190428 A1 | 8/2006 | Jung et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0212531 A1 | 9/2006 | Kikkawa et al. |
| 2006/0224629 A1 | 10/2006 | Alexander et al. |
| 2006/0230394 A1* | 10/2006 | Forth et al. .................. 717/168 |
| 2006/0240804 A1 | 10/2006 | Backholm et al. |
| 2006/0240805 A1 | 10/2006 | Backholm et al. |
| 2006/0242210 A1 | 10/2006 | Ring et al. |
| 2006/0242320 A1 | 10/2006 | Nettle et al. |
| 2006/0242607 A1 | 10/2006 | Hudson |
| 2006/0252435 A1 | 11/2006 | Henderson et al. |
| 2006/0265595 A1 | 11/2006 | Scottodiluzio |
| 2006/0277265 A1 | 12/2006 | Backholm et al. |
| 2006/0294071 A1 | 12/2006 | Weare et al. |
| 2007/0005738 A1 | 1/2007 | Alexion-Tiernan et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067381 A1 | 3/2007 | Grant et al. |
| 2007/0067424 A1 | 3/2007 | Raciborski et al. |
| 2007/0078857 A1 | 4/2007 | Punaganti et al. |
| 2007/0105627 A1* | 5/2007 | Campbell ........................ 463/40 |
| 2007/0116223 A1 | 5/2007 | Burke et al. |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0156824 A1 | 7/2007 | Thompson |
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | La Joie et al. |
| 2007/0276926 A1 | 11/2007 | LaJoie et al. |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0294295 A1 | 12/2007 | Finkelstein et al. |
| 2008/0001717 A1 | 1/2008 | Fiatal |
| 2008/0009344 A1 | 1/2008 | Graham et al. |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0077506 A1* | 3/2008 | Rampell et al. .................. 705/27 |
| 2008/0077571 A1 | 3/2008 | Harris et al. |
| 2008/0086379 A1 | 4/2008 | Dion et al. |
| 2008/0103877 A1 | 5/2008 | Gerken |
| 2008/0125225 A1 | 5/2008 | Lazaridis |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0192820 A1 | 8/2008 | Brooks et al. |
| 2008/0198995 A1 | 8/2008 | McGary et al. |
| 2008/0201362 A1 | 8/2008 | Multer et al. |

| | | | |
|---|---|---|---|
| 2008/0201751 A1 | 8/2008 | Ahmed et al. | |
| 2008/0207182 A1 | 8/2008 | Maharajh et al. | |
| 2008/0209491 A1 | 8/2008 | Hasek | |
| 2008/0270379 A1 | 10/2008 | Ramakrishna | |
| 2008/0298386 A1 | 12/2008 | Fiatal | |
| 2008/0299956 A1 | 12/2008 | Bailey et al. | |
| 2008/0313282 A1 | 12/2008 | Warila et al. | |
| 2009/0012841 A1 | 1/2009 | Saft et al. | |
| 2009/0016526 A1 | 1/2009 | Fiatal et al. | |
| 2009/0031006 A1 | 1/2009 | Johnson | |
| 2009/0054034 A1 | 2/2009 | Backholm et al. | |
| 2009/0055353 A1 | 2/2009 | Meema | |
| 2009/0063647 A1 | 3/2009 | Backholm et al. | |
| 2009/0075683 A1 | 3/2009 | Backholm et al. | |
| 2009/0110179 A1 | 4/2009 | Elsey et al. | |
| 2009/0119266 A1 | 5/2009 | Fitzpatrick et al. | |
| 2009/0125523 A1 | 5/2009 | Fitzpatrick et al. | |
| 2009/0144632 A1 | 6/2009 | Mendez | |
| 2009/0149203 A1 | 6/2009 | Backholm et al. | |
| 2009/0156178 A1 | 6/2009 | Elsey et al. | |
| 2009/0157792 A1 | 6/2009 | Fiatal | |
| 2009/0164433 A1 | 6/2009 | R. et al. | |
| 2009/0164560 A1 | 6/2009 | Fiatal | |
| 2009/0172565 A1 | 7/2009 | Jackson et al. | |
| 2009/0181641 A1 | 7/2009 | Fiatal | |
| 2009/0182500 A1 | 7/2009 | Dicke | |
| 2009/0191903 A1 | 7/2009 | Fiatal | |
| 2009/0193130 A1 | 7/2009 | Fiatal | |
| 2009/0193338 A1 | 7/2009 | Fiatal | |
| 2009/0221326 A1 | 9/2009 | Roussel et al. | |
| 2009/0241180 A1 | 9/2009 | Fiatal | |
| 2009/0248670 A1 | 10/2009 | Fiatal | |
| 2009/0248794 A1 | 10/2009 | Helms et al. | |
| 2009/0299817 A1 | 12/2009 | Fok et al. | |
| 2009/0307133 A1 | 12/2009 | Holloway et al. | |
| 2009/0318171 A1 | 12/2009 | Backholm et al. | |
| 2009/0323678 A1 | 12/2009 | Wang | |
| 2010/0057924 A1 | 3/2010 | Rauber et al. | |
| 2010/0146107 A1 | 6/2010 | Fiatal | |
| 2010/0174735 A1 | 7/2010 | Fiatal | |
| 2010/0279662 A1 | 11/2010 | Kuusinen et al. | |
| 2011/0138402 A1 | 6/2011 | Fleming | |
| 2011/0165889 A1 | 7/2011 | Fiatal et al. | |
| 2011/0179377 A1 | 7/2011 | Fleming | |
| 2011/0190014 A1 | 8/2011 | Fiatal | |
| 2011/0191474 A1 | 8/2011 | Fiatal | |
| 2011/0201304 A1 | 8/2011 | Sutaria et al. | |
| 2011/0207436 A1 | 8/2011 | Van Gent et al. | |
| 2011/0213898 A1 | 9/2011 | Fiatal et al. | |

FOREIGN PATENT DOCUMENTS

| | | | |
|---|---|---|---|
| EP | 1422899 A1 | 5/2004 | |
| EP | 1466261 A1 | 10/2004 | |
| EP | 1466435 A1 | 10/2004 | |
| EP | 1815634 A1 | 8/2007 | |
| EP | 1815652 A1 | 8/2007 | |
| EP | 1817883 A1 | 8/2007 | |
| FI | 117152 B1 | 6/2006 | |
| FI | 118288 B1 | 9/2007 | |
| FI | 119581 B1 | 12/2008 | |
| JP | 4154233 A | 5/1992 | |
| JP | 10-336372 A | 12/1998 | |
| JP | 2001-218185 A | 8/2001 | |
| JP | 2001-350718 A | 12/2001 | |
| JP | 2001-356973 A | 12/2001 | |
| JP | 2005-515664 A | 5/2005 | |
| JP | 4386732 | 10/2009 | |
| WO | WO-97/41661 A2 | 11/1997 | |
| WO | WO-98/24257 A1 | 6/1998 | |
| WO | WO-98/58322 A2 | 12/1998 | |
| WO | WO-01/30130 A2 | 5/2001 | |
| WO | WO-03/007570 A1 | 1/2003 | |
| WO | WO-03/058483 A1 | 7/2003 | |
| WO | WO-03/058879 A1 | 7/2003 | |
| WO | WO-03/098890 A1 | 11/2003 | |
| WO | WO-2004045171 A1 | 5/2004 | |
| WO | WO-2005/015925 A2 | 2/2005 | |
| WO | WO-2005/020108 A1 | 3/2005 | |
| WO | WO-2006/045005 A2 | 4/2006 | |
| WO | WO-2006/045102 A2 | 4/2006 | |
| WO | WO-2006/053952 A1 | 5/2006 | |
| WO | WO-2006/053954 A1 | 5/2006 | |
| WO | WO-2006/058967 A1 | 6/2006 | |
| WO | WO-2007/015725 A2 | 2/2007 | |
| WO | WO-2007/015726 A1 | 2/2007 | |
| WO | WO-2007/149526 A2 | 12/2007 | |
| WO | WO-2007/149540 A2 | 12/2007 | |

OTHER PUBLICATIONS

Augun, Audrey, "Integrating Lotus Notes With Enterprise Data," Lotus Notes Advisory, pp. 22-25, Jul.-Aug. 1996.

Balaban, Bob, "This Is Not Your Father's Basic: LotusScript in Notes Release 4," The View, vol. 1, Issue 5, 32 pages, Nov.-Dec. 1995.

Bedell, Doug, "Meeting Your New Best Friends Six Degrees Widens Your Contacts in Exchange for Sampling Web Sites," The Dallas Morning News, 4 pages, Oct. 27, 1998.

Bergman, Lawrence D. et al., "Programming-By-Demonstration for Behavior-Based User Interface Customization," IBM Research Report, RC23116, 5 pages, Feb. 20, 2004.

B'Far, Reza et al., "Designing Effective User Interfaces for Wireless Devices," Publication Unknown, 14 pages, Date Unknown—published prior to Feb. 23, 2006.

Blaney, Jeff, "You Can Take It With You—An Introduction to Mobile Computing With Notes R4," The View, vol. 2, Issue 1, 14 pages, Jan.-Feb. 1996.

Brown, Kevin et al., "Mastering Lotus Notes®," Sybex Inc., 996 pages, 1995.

"Chapter: About NotesPump," Publication Unknown, 480 pages, Date Unknown—published prior to Jan. 8, 2003.

"Chapter 13-1—Anatomy of a Note ID," Publication Unknown, 8 pages, Date Unknown—published prior to Jan. 8, 2003.

Cole, Barb et al., "Lotus Airs Notes-To-Database Integration Tool," Network World, 2 pages, Oct. 2, 1995.

Dahl, Andrew, "Lotus Notes® 4 Administrator's Survival Guide," Sams Publishing, 64 pages, 1996.

Decker, Stefan et al., "The Social Semantic Desktop," Digital Enterprise Research Institute, DERI Technical Report May 2, 2004, 7 pages, May 2004.

European Patent Application No. EP 03705704.9, Supplementary European Search Report, 4 pages, Jun. 9, 2010.

European Patent Application No. EP 03707338.4, Supplementary European Search Report, 2 pages, Apr. 18, 2011.

Falkner, Mike, "How to Plan, Develop, and Implement Lotus Notes® In Your Organization," John Wiley & Sons, Inc., 539 pages, 1996.

Freeland, Pat et al., "Lotus Notes 3-3.1 For Dummies™," IDG Books Worldwide, 389 pages, 1994.

Frenkel, Garry, "Pumping for Info: Notes and Database Integration," Network Computing, 10 pages, May 1, 1996.

Gameline, Advertisement, 1 page, 1982.

Gewirtz, David, "Lotus Notes 3 Revealed!," Prima Publishing, 261 pages, 1994.

Grous, Paul J., "Creating and Managing a Web Site With Lotus Internotes Web Publisher," The View, vol. 1, Issue 4, 20 pages, Sep.-Oct. 1995.

Haas, Zygmunt J. et al., "Mobile-TCP: An Asymmetric Transport Protocol Design for Mobile Systems," IEEE, pp. 1054-1058, 1997.

Haas, Zygmunt J. et al., "The Design and Performance of Mobile TCP for Wireless Networks," Journal of High Speed Networks, vol. 10, pp. 187-207, 2001.

Hajdu, Kalman et al., "Lotus Notes Release 4 in a Multiplatform Environment," IBM Corporation, 173 pages, Feb. 1996.

Hardy, Ed, "Microsoft Proposes Two New Thumb-Driven User Interfaces," Brighthand Consulting, Inc., 2 pages, 2003.

IBM Corporation, "The Architecture of Lotus Notes," White Paper No. 114654, 26 pages, May 31, 1995.

IBM Corporation, "The History of Notes and Domino," Lotus Developer Domain, 11 pages, Sep. 29, 2003.

ImTOO, "ImTOO iPod Movie Converter," 3 pages, Nov. 9, 2005.

IntelliLink Corporation, "IntelliLink® for Windows Users Guide," Version 3.0, 167 pages, 1994.

International Application No. PCT/US2003/000618, International Search Report, 1 page, Apr. 4, 2003.

International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Date Unknown—published prior to Jan. 8, 2003.
Lotus Development Corporation, "Lotus Notes Customer Support Guide—North American Guide," Release 4.1, 51 pages, Date Unknown—published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Releaset 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Date Unknown—published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Date Unknown—published prior to Jan. 8, 2003.
Lotus Development Corporation, "Lotus Notes Quick Reference for Macintosh," Release 3, 6 pages Date Unknown—published prior to Jan. 8, 2003.
Lotus Development Corporation, "Lotus Notes Quick Reference for SmartIcons," Release 3.1, 4 pages, Date Unknown—published prior to Jan. 8, 2003.
Lotus Development Corporation, "Lotus Notes Quick Reference for Windows and Presentation Manager," Release 3, 6 pages, Date Unknown—published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.

Lotus Development Corporation, "Lotus Notes Step by Step—A Beginner's Guide to Lotus Notes," Release 4.1, 167 pages, 1996.

Lotus Development Corporation, "Lotus Software Agreement," 8 pages, Date Unknown—published prior to Jan. 8, 2003.

Lotus Development Corporation, "What Is the Notes Replicator?," Lotus Notes Knowledge Base, 8 pages, Jul. 5, 1995.

"Lotus Notes Advisor," Advisor Publications Inc., 55 pages, Jun. 1995.

"Lotus Notes Advisor," Advisor Publications Inc., 55 pages, Aug. 1995.

"Lotus Notes Advisor," Advisor Publications Inc., 55 pages, Oct. 1995.

"Lotus Notes Advisor," Advisor Publications Inc., 55 pages, Dec. 1995.

"Lotus Notes Advisor," Advisor Publications Inc., 63 pages, Jan.-Feb. 1996.

"Lotus Notes Advisor," Advisor Publications Inc., 55 pages, Apr. 1996.

"Lotus Notes Advisor," Advisor Publications Inc., 55 pages, Jun. 1996.

"Lotus Notes Advisor," Advisor Publications Inc., 55 pages, Aug. 1996.

"Lotus Notes Advisor," Advisor Publications Inc., 55 pages, Oct. 1996.

"Lotus Notes Advisor," Advisor Publications Inc., 63 pages, Dec. 1996.

"Lotus Notes—Notes Administration Help," Screen Shots, 17 pages, Date Unknown—published prior to Jan. 8, 2003.

MacGregor, Rob et al., "The Domino Defense: Security in Lotus Notes and the Internet," IBM Corporation, 183 pages, Dec. 1997.

Maltz, David A. et al., "MSOCKS: An Architecture for Transport Layer Mobility," IEEE, pp. 1037-1045, 1998.

Marmel, Elaine, "Easy Lotus® Notes Release 4.0," Que Corporation, 237 pages, 1996.

Mason, Luke, "Windows XP: New GUI Design Shows Skin Is In," TechRepublic, 4 pages, Apr. 4, 2001.

McMullen, Melanie, "Network Remote Access and Mobile Computing," Miller Freeman Inc., 226 pages, 1994.

Microsoft, Definition of "Access," Microsoft Computer Dictionary, Fifth Edition, 2 pages, May 1, 2002.

Microsoft, Definition of "Synchronization," Microsoft Computer Dictionary, Fifth Edition, 2 pages, May 1, 2002.

Milgram, Stanley, "The Small-World Problem," Psychology Today, vol. 2, pp. 60-67, 1967.

Miller, Victor S., "Use of Elliptic Curves in Cryptography," Advances in Cryptology—CRYPTO '85 Proceedings, vol. 218, pp. 417-426, 1985.

Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.

Myers, Brad A. et al., "User Interfaces That Span Hand-Held and Fixed Devices," CHI'2001 Workshop on Distributed and Disappearing User Interfaces in Ubiquitous Computer, 4 pages, 2001.

National Institute of Standards and Technology, "Advanced Encryption Standard (AES)," Federal Information Processing Standards Publication 197, 52 pages, Nov. 26, 2001.

National Institute of Standards and Technology, "Secure Hash Standard," Federal Information Processing Standards Publication 180-2, 83 pages, Aug. 1, 2002.

Netscape Communications Corporation, "Netscape Mail Server Administrator's Guide," Version 2.0, 172 pages, 1996.

Netscape Communications Corporation, "Netscape Mail Server Installation Guide," Version 2.0 for Unix, 62 pages, 1996.

Netscape Communications Corporation, "Netscape Mail Server User's Guide," Version 2.0, 35 pages, 1996.

Netscape Communications Corporation, "Netscape News Server Administrator's Guide for Windows NT," Version 2.0, 119 pages, 1996.

Niederée, Claudia et al., "A Multi-Dimensional, Unified User Model for Cross-System Personalization," Proceedings of the AVI 2004 Workshop on Environments for Personalized Information Access, 11 pages, 2004.

Nokia, "Developer Platforms," 3 pages, 2005.

"NotesPump 1.0 Release Notes," Publication Unknown, 8 pages, Date Unknown—published prior to Jan. 8, 2003.

Opyt, Barbara et al., "Use the Internet As Your Lotus Notes WAN," Lotus Notes Advisor, pp. 17-20, Nov.-Dec. 1996.

Ortiz, C. Enrique, "An Introduction to the Symbian OS™ Platform for Palm OS® Developers," Metrowerks Corp., 21 pages, 2002.

"Overview—What Is Lotus NotesPump?," Publication Unknown, 88 pages, Date Unknown—published prior to Jan. 8, 2003.

Phillips, Joshua et al., "Modeling the Intelligence Analysis Process for Intelligent User Agent Development," Research and Practice in Human Resource Management, vol. 9, No. 1, pp. 59-73, 2001.

Pyle, Hugh, "The Architecture of Lotus Notes," Lotus Notes Advisor, Premiere Issue, pp. 18-27, 1995.

Pyle, Lisa, "A Jump Start to the Top Ten R3-To-R4 Migration Considerations," The View, vol. 1, Issue 5, 22 pages, Nov.-Dec. 1995.

Ringel, Meredith et al., "iStuff: A Scalable Architecture for Lightweight, Wireless Devices for Ubicomp User Interfaces," Proceedings of UbiComp 2002, 2 pages, 2002.

Shafran, Andrew Bryce, "Easy Lotus Notes® for Windows™," Que Corporation, 199 pages, 1994.

Signorini, Eugene, "SEVEN's Service-Based Wireless Solutions Enable Enterprises to Untether E-Mail," Wireless/Mobile Enterprise & Commerce, 16 pages, Oct. 2004.

Swedeen, Bret et al., "Under the Microscope—Domino Replication," LDD Today, 8 pages, Oct. 1, 1998.

Tamura, Randall A., "Lotus® Notes™ 4 Unleashed," Sams Publishing, 928 pages, 1996.

U.S. Appl. No. 60/663,463, File History, 113 pages, Mar. 18, 2005.

Vivacqua, Adriana et al., "Profiling and Matchmaking Strategies in Support of Opportunistic Collaboration," CoopIS/DOA/ODbase 2003, LNCS 2888, pp. 162-177, 2003.

Wainwright, Andrew, "Secrets to Running Lotus Notes: The Decisions No One Tells You How to Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

* cited by examiner

PROVISIONING APPLICATIONS FOR A MOBILE DEVICE

BACKGROUND OF THE INVENTION

1. Field of the Invention

The present invention generally relates to mobile devices. More specifically, the present invention relates to provisioning mobile device applications.

2. Description of Related Art

Presently available applications may be provisioned for use on mobile devices. Provisioning may include supplying and configuring resources of the mobile device to enable the mobile device to access and operate an application. Various applications may require certain configurations, settings, or software on a mobile device and/or software installed on a personal computing device. Examples of applications may include corporate email applications and marketing applications.

Many users do not have the knowledge, time, or patience to provision applications for their mobile devices. Absent such an undertaking, however, the application may never be fully installed or utilized to its full capacity. The application provider may lose any advantages that come with providing the application to the mobile device. The user also loses any advantages of having and being able to operate the application.

Another presently available way to provide the application to the mobile phone has been to initiate set-up of the application using a personal computing device. While some users may initiate the provisioning process using their personal computing device, a large number of users may not do so for lack of knowledge, ability, resources, inclination, etc. There is, therefore, a need in the art for improved methods and systems of provisioning applications for mobile devices.

SUMMARY OF THE INVENTION

Exemplary systems and methods of the present invention provide for provisioning applications for a mobile device. A user browsing a mobile device may discover and request a new application. A request concerning the application is sent to a network server. The request includes information concerning the mobile device and/or the user of the mobile device. Using the mobile device information, the network server sends a communication accessible by a computing device associated with the user. In response to the communication, the user may choose to provide information to the network server. The information provided by the user is used to determine the requirements for operating the requested application on the mobile device. A hyperlink for downloading the requirements information is sent to the user of the mobile device via text messaging and/or email. The requirements information may be provided directly to the mobile device, to a personal computing device associated with the user of the mobile device, or a combination.

Various embodiments of the present invention include methods for provisioning a mobile device for operating an application. Such methods may include receiving information from the mobile device, sending a communication accessible by a computing device associated with the user based on the received information, determining the requirements for the mobile device to operate the application based on information provided by the user using the computing device, and providing the determined requirements to the user of the mobile device. The requirements may be provided for download using a hyperlink. The hyperlink may be provided to the mobile device via text message. Alternatively, the hyperlink may be emailed to an email address associated with the user of the mobile device. Some embodiments include downloading various requirements to a personal computing device associated with the user of the mobile device. Confirming that the mobile device is provisioned for operating the application and limiting operation of the application based on the confirmation may also occur.

An exemplary provisioning system may include a network server for receiving information from a mobile device associated with a user, sending a communication accessible by a computing device associated by the user, and for determining requirements for operating an application based on information provided by the user using the computing device, and an outbound communications server. The system may further include a device management module executable by the network server to manage various devices, including limiting operation of applications based on confirmation of provisioning of the mobile device.

Embodiments of the present invention include computer-readable storage media having embodied thereon programs that, when executed by a processor or computing device, perform methods for provisioning applications for a mobile device.

DETAILED DESCRIPTION

A user operating a mobile device may request a new application. A request concerning the application is sent to a network server. The request includes information concerning the mobile device and/or the user of the mobile device. The network server sends a communication that is accessible by a computing device associated with the user. The user may provide further information in response to the communication. The information provided by the user is used to determine the requirements for operating the requested application on the mobile device. The requirements information may be provided directly to the mobile device, to a personal computing device associated with the user of the mobile device, or a combination. In some embodiments, a hyperlink for downloading the requirements information is sent to the user of the mobile device via text messaging and/or email.

Figure 1:
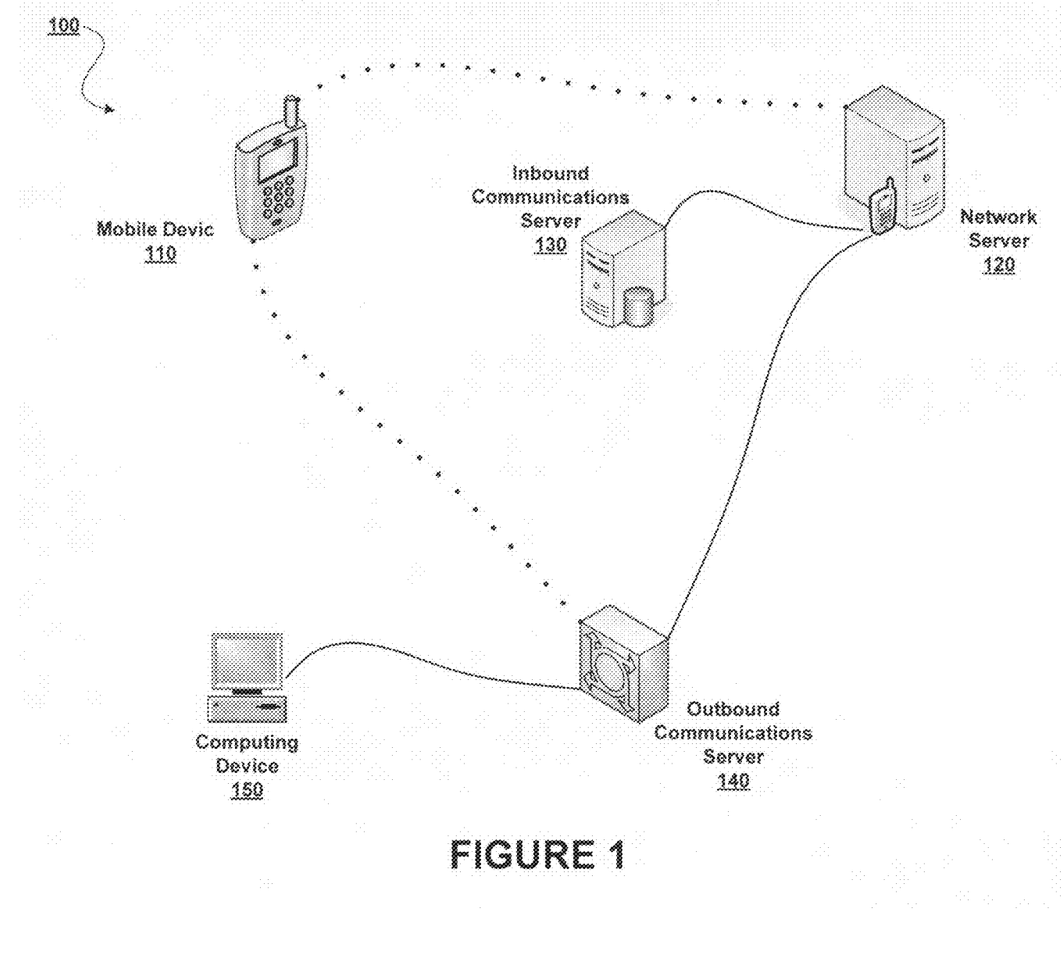
FIG. 1 is an exemplary system for provisioning a mobile device in a communications network.

FIG. 1 is an illustration of an exemplary implementation of a system for provisioning mobile device 110 using a communications network 100. In communications network 100, mobile device 110 can communicate with network server 120 wirelessly. The communications network 100 further allows for network server 120 to communicate over a wired or wireless connection with inbound communication server 130, outbound communication server 140, which can communicate with computing device 150 via email.

Communications network 100 may relate a variety of devices (e.g., mobile devices, computing devices) coupled to one another via a variety of communications channels (e.g., mobile telephone base stations, Internet). In that regard, networks should be interpreted as being inclusive rather than exclusive.

Mobile device 110 is inclusive of any variety of mobile devices that are capable of communicating over the Internet. Such communication may also include the use of a wireless or landline mobile network. Mobile device 110 is inclusive of cellular telephones, smart phones, PDAs, wireless e-mail devices, and handheld computers. A variety of mobile networks and communications channels for enabling Internet access are well known in the art.

Network server 120 may be any combination of computer hardware and software configured to receive and transmit information. Network server 120 may be, for example, an enterprise server, such as that found in any number of corporate entities and businesses. Network server 120 may be configured to communicate with multiple devices such as mobile device 110, inbound communications server 130, and computing device 150 via outbound communications server 140.

Inbound communications server 130 and outbound communications server 140 may be any kind of computing system that allows for various communications applications. Inbound communication server 130, in FIG. 1, provides user interfaces and download mechanisms for configuring settings and downloading components to network server 120. Network server 120 may then relay such interfaces and/or download mechanisms to mobile device 110 or to computing device 150.

Outbound communications server 140 provides information to the user of the mobile device 110 by, for example, email. Outbound communications server 140 may be an enterprise server such as that found in any number of corporate entities and businesses. Outbound communication server 140 may be configured to be accessed by multiple computing devices, such as computing device 150. In one example, the outbound communications server 140 may be a Microsoft® Exchange® server. Computing device 150 may access e-mail on the outbound communications server 140 through a client software application (not shown) such as Microsoft® Outlook®. Outbound communications server 140 may also store e-mail inboxes, contact lists, and various other types of data. Outbound communications server 140 may communicate with a mobile device (e.g., mobile device 110) or a computing device (e.g., computing device 150) over a local area network (LAN) and/or a wide area network (WAN) such as the Internet.

Computing device 150 may be any of a variety of desktop, laptop, or personal computer configured to communicate with outbound communications server 140 over, for example, the Internet. In some embodiments, computing device 150 may receive communications and requirements information. For example, a user of computing device 150 may receive an email prompting the user to provide certain information. The user may then use computing device 150 to respond and provide such information via a response email, a designated website, or the like. Further, the user may also receive emails including one or more hyperlinks for downloading requirements information, which may include configurations, settings, and various components for operating an application.

Figure 2:
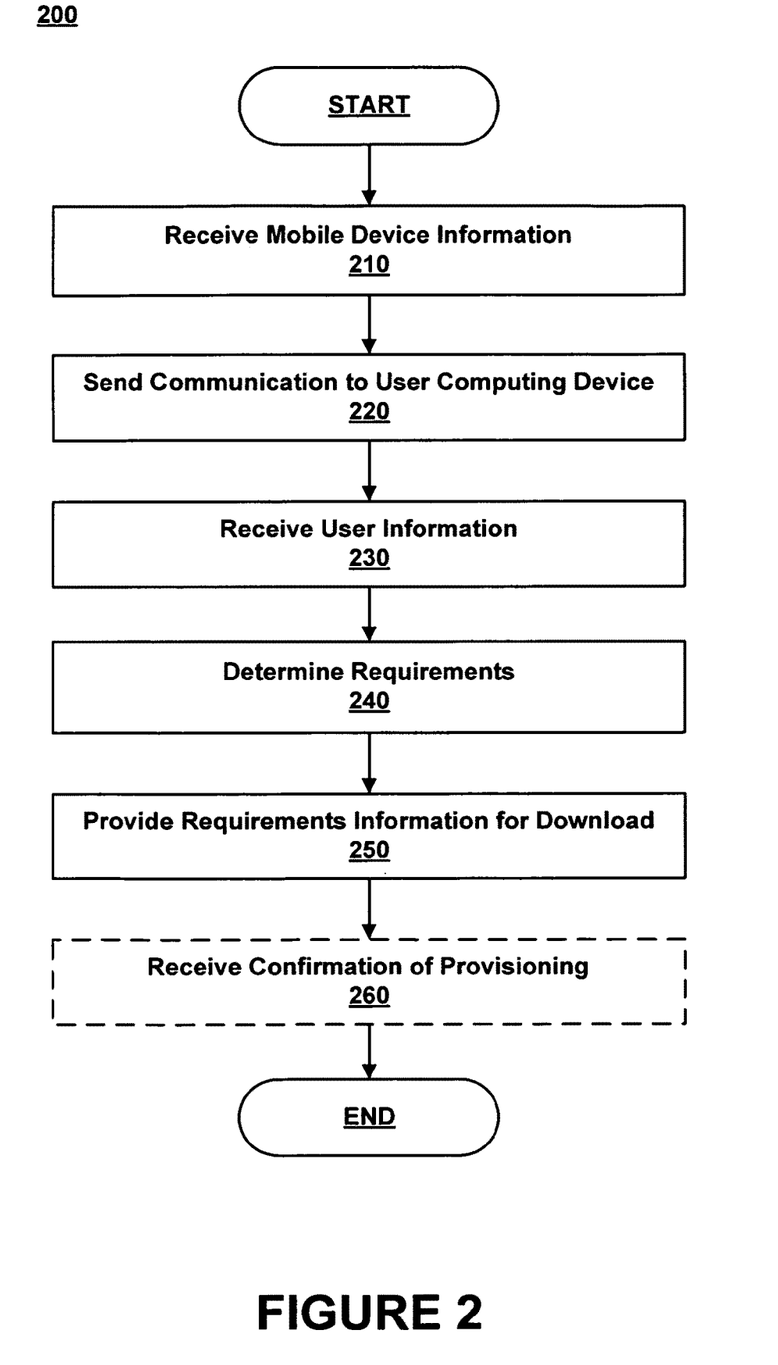
FIG. 2 is a flowchart depicting a method for provisioning a mobile device.

FIG. 2 is a flowchart depicting an exemplary method 200 for provisioning a mobile device. In the method 200, information concerning a mobile device is received. A communication accessible by a computing device associated with the user is sent. In response, the user may provide certain information. The necessary requirements for the mobile device to operate a particular application are determined based on the information provided by the user. A hyperlink to information concerning the requirements may optionally be generated and provided via email to a user of the mobile device. The hyperlink allows the user to download the determined requirements information, which may be used to provision the mobile device. Once the application is provisioned for operation on the mobile device, confirmation may optionally be received from the mobile device.

In step 210, information concerning the mobile device 110 is received at network server 120. The information may include, for example, phone numbers associated with the mobile device 110, email addresses associated with the mobile device 110, or email associated with the user of the mobile device 110. The information may further include current settings, configurations, and various components of the mobile device 110.

The communication of the information may be initiated automatically by the mobile device, by request of a user of the mobile device 110, or in response to a request from the network server 120. For example, mobile device 110 may include an indication concerning the application. A user interested in operating the application may select the indication. The selection may initiate the gathering of information from a memory and/or a subscriber identity module (SIM) card of the mobile device 110 and communication of the information to the network server 120.

In step 220, a communication accessible by a computing device 150 associated with the user is sent. For example, network server 120 may send an email to an email address received in step 210. Such an email may be accessed by the user using a computing device 150, which allows for more complex user interfaces than the mobile device 110. Further, some applications may require information concerning the computing device 150 (e.g., configurations) and/or that certain components be installed on computing device 150.

In step 230, user information is received. The communication sent by the network server 120 may request that the user provide certain information. The user using computing device 150 may be able to respond in a response email, at a designated (e.g. hyperlinked) website, or the like.

In step 240, the network server 120 determines, based on the received information, what requirements are necessary for operating an application on the mobile device 110. Requirements may include configuration, settings, and various components that are necessary for the mobile device 110 to operate the application. Network server 120 can evaluate the received information and determine what changes in configuration, setting, and components are needed for the mobile device 110 to operate the particular application. Alternatively, mobile device 110 may be able to determine the requirements for operating the particular application and request such requirements from the network server 120.

In step 250, the requirements information may be provided for download onto mobile device 110 and/or computing device 150. The information may concern various configurations, settings, and/or downloadable components. The requirements information may further include instructions to the user concerning provisioning the mobile device.

In some embodiments, the network server 120 may provide the requirements information by generating and sending a hyperlink for downloading information concerning the determined requirements. Generating a hyperlink may include storing the requirements information at a particular location on the network server 120 or inbounds communication server 130 and associating the hyperlink with the location. The hyperlink is sent to the user of the mobile device 110. In various embodiments of the present invention, the hyperlink may be sent to the mobile device 110 as a text message. Alternatively, the hyperlink may be sent in an email to an email address of the user. The user may be able to retrieve the email using the mobile device 110 and/or a computing device 150. Some applications may require, for example, that some configurations and/or software be installed on a computing device 160 associated with the user and/or a network service to order to enable the mobile device to access and operate those applications. Other means may be utilized for delivery of information concerning download of information as it pertains to determined requirements.

In an optional step 260, confirmation concerning provisioning of the mobile device is received by network server 120. In some embodiments of the present invention, network server 120 may include or be associated with or working in conjunction with another computing device including a device management module (not pictured). Execution of the device management module may limit operation of the application until confirmation is received from the mobile device 110.

Figure 3:
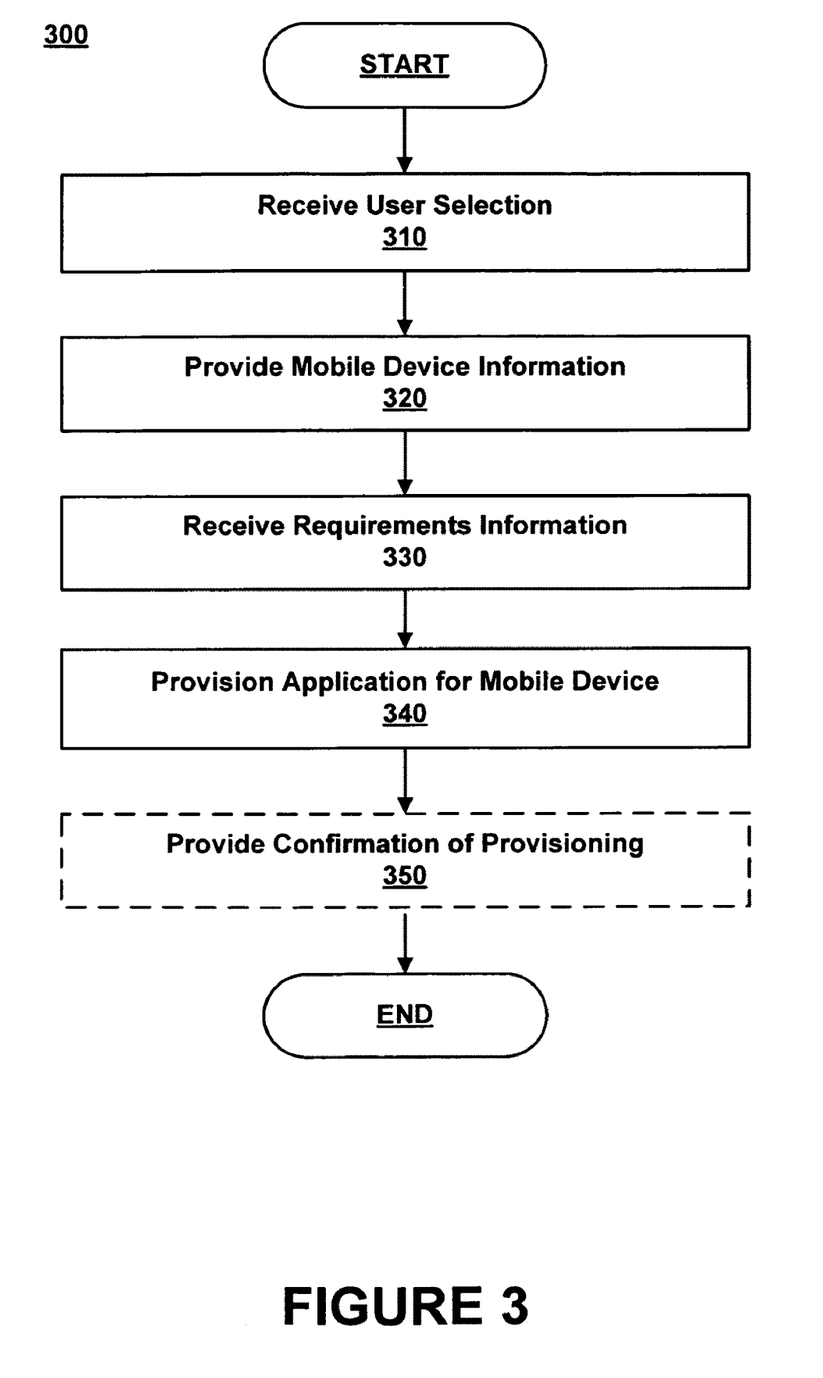
FIG. 3 is a flowchart depicting an alternative method for provisioning a mobile device.

FIG. 3 is a flowchart depicting another exemplary method 300 for provisioning a mobile device 110. In the method 300, a user selection is received concerning an application to be used on the mobile device 110. User information and mobile device information is provided as a part of or subsequent to that user selection. In response, information concerning requirements for operating an application on the mobile device 110 is generated and provided to the mobile device 110 although other information delivery/access methodologies may be used. The information may be used to provision the mobile device 110, and confirmation concerning the completed provisioning is optionally sent to the network server 120.

In step 310, a user selection is received concerning an application to be used on the mobile device 110. An indication concerning the application may be sent or made available on the mobile device 110. The user may choose to select the indication by clicking on an icon or pressing a button.

In step 320, mobile device information, which may include information concerning the user of the mobile device 110, may be provided to and received by the network server 120. The user information may be information previously provided by the user and stored on the phone in memory or a SIM card. Alternatively, the user selection may prompt a request for certain information, such as an email address for the user. Such information, along with information concerning the mobile device, may be sent to the network server 120 in, for example, an SMS text message.

In step 330, information concerning requirements for operating the desired application is received by the mobile device 110. For example, a hyperlink to downloadable information may be received in a text message or email received at the mobile device 110 or at the computing device 150. Depending on the application, the hyperlink may be used to download configurations, settings, or components onto the mobile device 110 and/or computing device 150. In some embodiments, the hyperlink may allow for download of a user interface or download mechanisms that facilitate the provisioning of the application for the mobile device 110. Other means for delivery of information to the device may be used as well.

In step 340, the mobile device 110 is provisioned based on the requirements information. For example, various configuration s and settings may be implemented on the mobile device 110. Software components, for example, may be downloaded and installed on the mobile device 110. Further, the user interfaces and download mechanisms may help the user in provisioning the mobile device 110.

In an optional step 350, once the mobile device 110 has been provisioned for use with the desired application, confirmation may be sent. The mobile device 110 may automatically or upon request send a communication to network server 120 indicating that the mobile device 110 is provisioned and ready to operate the particular application.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile and volatile media as well as transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for provisioning an application for a mobile device, the method comprising:
   receiving a request for the application, the request being initiated via the mobile device;
   sending a communication accessible on a computing device based on the request for the application;
   determining configuration information for the mobile device to operate the application based on information provided by a user using the computing device in response to the communication sent to the computing device; and
   providing the configuration information to the mobile device for use in provisioning the application;
   wherein, the configuration information of the mobile device, specifies components to be installed on the computing device to provision the application on the mobile device.

2. The method of claim 1, wherein the configuration information includes, one or more of, a setting or a network service to be implemented for the mobile device to operate the application.

3. The method of claim 1, wherein the configuration information includes, one or more of, executing or installing a downloadable component for the mobile device to operate the application.

4. The method of claim 1, wherein, the communication accessible on the other computing device is sent in an email.

5. The method of claim 1, wherein, the communication accessible on the computing device, includes an information request from a user of the mobile device, the user being able to respond to the information request in a response email or via a website.

6. The method of claim 1, further comprising, generating a hyperlink for downloading the configuration information, the hyperlink provided to the mobile device.

7. The method of claim 6, wherein the hyperlink is provided in a text message to the mobile device.

8. The method of claim 6, wherein the hyperlink is provided in an email to the mobile device.

9. The method of claim 1, further comprising receiving confirmation that the application is provisioned for the mobile device and limiting operation of the application on the mobile device until confirmation.

10. A method for provisioning an application for a mobile device, the method comprising:
responsive to detecting selection of the application made at the mobile device, identifying, from the mobile device, user information and the mobile device information of the mobile device;
wherein, the user information and mobile device information concerning the mobile device are provided to a network server for use in determining requirements for operating the application on the mobile device;
wherein, the user information is stored in device memory or on a SIM card of the mobile device;
provisioning the application on the mobile device based on the requirements for operating the application;
wherein, the requirements for operating the application, specifies components to be installed to provision the application on the mobile device.

11. A system for provisioning an application for a mobile device, the system comprising
a network server configured to
receive a request for the application, the request being initiated via the mobile device;
send a communication accessible on a computing device based on the request for the application, and
determine configuration information for the mobile device to operate the application based on information provided by a user using the computing device in response to the communication sent to the computing device;
wherein, the configuration information of the mobile device, specifies components to be installed on the computing device to provision the application on the mobile device; and
an outbound communication server configured to provide the configuration information to the mobile device for use in provisioning the application.

12. The system of claim 11, further comprising an inbound communications server configured to provide the configuration information for download.

13. The system of claim 12, wherein at least some of the configuration information is downloaded to the other computing device.

14. The system of claim 12, wherein at least some of the configuration information is downloaded to a network service associated with the user of the mobile device.

15. The system of claim 12, wherein the network server is further configured to generate a hyperlink for downloading the configuration information.

16. The system of claim 15, wherein the outbound communication server is further configured to provide the configuration information by sending an email including the hyperlink to the user of the mobile device.

17. The system of claim 15, wherein the outbound communication server is further configured to provide the configuration information by sending a text message including the hyperlink to the mobile device.

18. The system of claim 11, wherein the network server confirms that the application is provisioned for the mobile device.

19. The method of claim 10, wherein, the user information is previously provided by the user.

20. The method of claim 10, wherein, the requirement for operating the application includes, one or more of, a setting or a network service to be implemented for the mobile device to operate the application.

21. The method of claim 10, wherein, the user information and the mobile device information are sent in an SMS text message to the network server.

22. The method of claim 10, wherein, the requirements for operating the application are received in a hyperlink at the mobile device.

23. The method of claim 22, wherein, the hyperlink is received in an SMS text message.

24. The method of claim 22, wherein, the hyperlink is received in an email message.

25. A method for provisioning an application for a mobile device, the method comprising:
responsive to detecting a request to access the application at the mobile device;
determining, by the mobile device, required information for operating the application;
requesting, from a network server, the requirement information for operating the application on the mobile device;
receiving the requirement information from the network server; and
provisioning the application on the mobile device based on the required information;
wherein, the requirement information of the mobile device, specifies components to be installed to provision the application on the mobile device.

26. The method of claim 25, further comprising,
in response to detecting the request, automatically identifying, from the mobile device, user information the mobile device information of the mobile device;
wherein, the user information and mobile device information of the mobile device are also used by the network server in further determining required information for accessing the application on the mobile device.

* * * * *

UNITED STATES PATENT AND TRADEMARK OFFICE
CERTIFICATE OF CORRECTION

| | |
|---|---|
| PATENT NO. | : 8,078,158 B2 |
| APPLICATION NO. | : 12/215481 |
| DATED | : December 13, 2011 |
| INVENTOR(S) | : Ari Backholm |

It is certified that error appears in the above-identified patent and that said Letters Patent is hereby corrected as shown below:

In column 8, line 44, in claim 25, delete "requirement" and insert -- required --, therefor.

In column 8, line 47, in claim 25, delete "requirement" and insert -- required --, therefor.

In column 8, line 51, in claim 25, delete "requirement" and insert -- required --, therefor.

In column 8, line 56, in claim 26, delete "information" and insert -- information and --, therefor.

In column 8, line 58, in claim 26, after "and" insert -- the --, therefor.

In column 8, line 60, in claim 26, after "determining" insert -- the --, therefor.

Signed and Sealed this
Sixteenth Day of October, 2012

David J. Kappos
*Director of the United States Patent and Trademark Office*